(12) United States Patent
Zheng et al.

(10) Patent No.: US 10,904,747 B2
(45) Date of Patent: Jan. 26, 2021

(54) SERVICE DATA PACKET ENCAPSULATION METHOD AND APPARATUS

(71) Applicant: HUAWEI TECHNOLOGIES CO., LTD., Guangdong (CN)

(72) Inventors: Xiuli Zheng, Beijing (CN); Xiaohu Xu, Shenzhen (CN); Jiao Wang, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 90 days.

(21) Appl. No.: 16/221,377

(22) Filed: Dec. 14, 2018

(65) Prior Publication Data

US 2019/0124498 A1    Apr. 25, 2019

Related U.S. Application Data

(63) Continuation of application No. PCT/CN2017/075888, filed on Mar. 7, 2017.

(30) Foreign Application Priority Data

Jul. 13, 2016    (CN) .......................... 2016 1 0548606

(51) Int. Cl.
*H04W 4/00*    (2018.01)
*H04W 8/26*    (2009.01)
(Continued)

(52) U.S. Cl.
CPC .............. *H04W 8/26* (2013.01); *H04L 29/06* (2013.01); *H04L 61/10* (2013.01);
(Continued)

(58) Field of Classification Search
None
See application file for complete search history.

(56) References Cited

U.S. PATENT DOCUMENTS

| 6,947,398 B1 * | 9/2005 | Ahmed | ................... H04W 8/04 370/328 |
| 2004/0162819 A1 * | 8/2004 | Omae | ................... H04W 48/16 |

(Continued)

FOREIGN PATENT DOCUMENTS

| CN | 102025587 A | 4/2011 |
| CN | 102457582 A | 5/2012 |
| JP | 2012085208 A | 4/2012 |

OTHER PUBLICATIONS

X. Xu et al. Routing Architecture for the Next Generation Internet (RANGI), draft-xu-rangi-04, Aug. 10, 2010, total 13 pages. XP15070517.

(Continued)

*Primary Examiner* — Bob A Phunkulh
(74) *Attorney, Agent, or Firm* — Rimon PC

(57) ABSTRACT

The present application discloses a service data packet encapsulation method and apparatus. The method includes at least: obtaining, by a source communications device, a mobility support parameter of a current service, where the mobility support parameter is used to indicate whether a corresponding service requires mobility support, and the source communications device includes at least an ID identifier layer and a locator layer; determining, by the source communications device based on the mobility support parameter of the current service, whether the current service requires mobility support; and obtaining, by the source communications device, a source locator of the source communications device and a destination locator of a destination communications device when determining that the current service does not require mobility support, and performing, by using the source locator and the destination locator, locator layer encapsulation on a data packet that needs to be sent by the current service.

14 Claims, 9 Drawing Sheets

(51) Int. Cl.
*H04L 29/06* (2006.01)
*H04L 29/12* (2006.01)
*H04W 80/04* (2009.01)
*H04W 88/02* (2009.01)

(52) U.S. Cl.
CPC ...... *H04L 61/2007* (2013.01); *H04L 61/6004* (2013.01); *H04L 69/161* (2013.01); *H04W 80/04* (2013.01); *H04W 88/023* (2013.01)

(56) References Cited

U.S. PATENT DOCUMENTS

| | | | |
|---|---|---|---|
| 2009/0199268 A1* | 8/2009 | Ahmavaara | H04L 12/4633 726/1 |
| 2010/0165999 A1* | 7/2010 | Tchepnda | H04W 12/06 370/400 |
| 2010/0210269 A1* | 8/2010 | Shuai | H04W 36/0022 455/436 |
| 2012/0177049 A1 | 7/2012 | Xu et al. | |
| 2016/0105790 A1* | 4/2016 | Shu | H04W 8/18 455/435.1 |

OTHER PUBLICATIONS

RFC6832, D. Lewis et al. Interworking between Locator/ID Separation Protocol (LISP) and Non-LISP Sites, Internet Engineering Task Force (IETF), Jan. 2013, total 19 pages. XP15086544.
D. Farinacci et al. LISP Mobile Node, draft-meyer-lisp-mn-15, Jul. 5, 2016, XP15113917, total 22 pages.

* cited by examiner

| Source locator | Destination locator | Source identifier | Destination identifier | Payload |

| Source locator | Destination locator | Payload |

SERVICE DATA PACKET ENCAPSULATION METHOD AND APPARATUS

CROSS-REFERENCE TO RELATED APPLICATIONS

This application is a continuation of International Application No. PCT/CN2017/075888, filed on Mar. 7, 2017, which claims priority to Chinese Patent Application No. 201610548606.8, filed on Jul. 13, 2016. The disclosures of the aforementioned applications are hereby incorporated by reference in their entireties.

TECHNICAL FIELD

The present application relates to the field of mobile communications technologies, and in particular, to a service data packet encapsulation method and apparatus.

BACKGROUND

The Transmission Control Protocol/Internet Protocol (TCP/IP) protocol is a most basic Internet communications protocol. As shown in FIG. 1, the TCP/IP protocol mainly includes four layers: an application layer, a transport layer, a network layer, and a network interface layer from top to bottom. Because in a TCP/IP protocol architecture shown in FIG. 1, an IP address of the network layer acts as both an identifier and a locator of a communications device, mobility, security, and multi-platform accessibility of the communications device are limited. In view of this, persons skilled in the art propose a TCP/IP protocol that is shown in FIG. 1. The TCP/IP protocol features an architecture in which an identifier (ID) and a locator are split. The TCP/IP protocol includes five layers: an application layer, a transport layer, an ID layer, a locator layer, and a network interface layer from top to bottom.

Currently, during communication, a source communications device using the foregoing ID/locator split architecture encapsulates a to-be-transmitted data packet successively based on communications protocols of the application layer, the transport layer, the ID layer, the locator layer, and the network interface layer from top to bottom, and then sends an encapsulated data packet to a destination communications device by using a current network access point.

In actual application, a plurality of services can be run in one source communications device. Some of these services require mobility support. When the source communications device moves, communication of a current service cannot be interrupted (for example, a video call or a voice call). Some of these services do not require mobility support. When the source communications device moves, communication of a current service can be interrupted (for example, web page browsing). In an existing ID/locator split technology, unified five-layer encapsulation is performed on data packets that need to be sent by all services. Consequently, network overheads are relatively high.

SUMMARY

Embodiments of the present application provide a service data packet encapsulation method and apparatus based on mobility support, to reduce network overheads.

According to a first aspect, a service data packet encapsulation method is provided, and includes:

obtaining, by a source communications device, a mobility support parameter of a current service, where the mobility support parameter is used to indicate whether a corresponding service requires mobility support, and the source communications device includes at least an ID identifier layer and a locator layer;

determining, by the source communications device based on the mobility support parameter of the current service, whether the current service requires mobility support; and obtaining, by the source communications device, a source locator of the source communications device and a destination locator of a destination communications device when determining that the current service does not require mobility support, and performing, by using the source locator and the destination locator, locator layer encapsulation on a data packet that needs to be sent by the current service.

In actual application, performing ID layer encapsulation on a data packet mainly aims to ensure that on-going communication of a communications device is not interrupted in a moving process. For a data packet that needs to be sent by a service that does not require mobility support, a short interrupt occurring in a communication process does not significantly affect user experience. Therefore, in this embodiment of the present application, the source communications device does not perform ID layer encapsulation on the data packet that needs to be sent by the service that does not require mobility support. Therefore, in the method in the present application, network overheads are reduced compared with the prior art in which five-layer encapsulation is performed on data packets that need to be sent by all services.

With reference to the first aspect, in a first possible implementation, the method further includes:

obtaining, by the source communications device, a source ID and the source locator of the source communications device and a destination ID and the destination locator of the destination communications device when the current service requires mobility support, performing, by using the source ID and the destination ID, ID layer encapsulation on the data packet that needs to be sent by the current service, and performing, by using the source locator and the destination locator, locator layer encapsulation on the data packet that needs to be sent by the current service.

It can be learned from the foregoing descriptions that, in the foregoing method, when the current service requires mobility support, ID layer encapsulation and locator layer encapsulation may be performed on the data packet sent by the current service.

With reference to the first aspect or the first possible implementation of the first aspect, in a second possible implementation, the method further includes:

obtaining, by the source communications device, a destination communications device identifier of the current service; and determining, by the source communications device based on the destination communications device identifier, a communications protocol used by the destination communications device, where the communications protocol is a TCP/IP communications protocol in an ID/locator split architecture or a TCP/IP communications protocol in an ID/locator unsplit architecture, a communications device using the TCP/IP communications protocol in the ID/locator split architecture includes at least an ID layer and a locator layer, and a communications device using the TCP/IP communications protocol in the ID/locator unsplit architecture includes at least an IP layer.

It can be learned from the foregoing descriptions that the communications protocol of the destination communications device may be determined by using the foregoing method.

With reference to the second possible implementation of the first aspect, in a third possible implementation, the destination communications device includes at least an ID layer and a locator layer; and the obtaining, by the source communications device, a source ID and the source locator of the source communications device and a destination ID and the destination locator of the destination communications device when the current service requires mobility support includes:

selecting, by the source communications device, two IP addresses from a preset address pool as the source ID and the source locator respectively, where the address pool is pre-allocated to the source communications device, and the address pool includes a plurality of IP addresses;

determining, by the source communications device by using a preset mapping relationship between a communications device identifier and an ID, an ID corresponding to the destination communications device identifier, and using the ID as the destination ID; and determining, by the source communications device by using a preset mapping relationship between an ID and a locator, a locator corresponding to the destination ID, and using the locator as the destination locator.

It can be learned from the foregoing descriptions that, in the foregoing method, when the destination communications device uses the communications protocol in the ID/locator split architecture, and the current service requires mobility support, the source ID and the source locator of the source communications device and the destination ID and the destination locator of the destination communications device may be obtained.

With reference to the second possible implementation of the first aspect, in a fourth possible implementation, the destination communications device includes at least an IP layer; and the obtaining, by the source communications device, a source ID and the source locator of the source communications device and a destination ID and the destination locator of the destination communications device when the current service requires mobility support includes:

selecting, by the source communications device, two IP addresses from a preset address pool as the source ID and the source locator respectively, where the address pool is pre-allocated to the source communications device, and the address pool includes a plurality of IP addresses;

obtaining, by the source communications device, a locator of a proxy routing device, and determining, by using a preset mapping relationship between a communications device identifier and an IP address, an IP address corresponding to the destination communications device identifier, where the proxy routing device is located between the source communications device and the destination communications device, and supports the TCP/IP communications protocol in the ID/locator split architecture and the TCP/IP communications protocol in the ID/locator unsplit architecture; and using, by the source communications device, the IP address corresponding to the destination communications device identifier as the destination ID, and using the locator of the proxy routing device as the destination locator.

It can be learned from the foregoing descriptions that, in the foregoing method, when the destination communications device uses the communications protocol in the ID/locator unsplit architecture, and the current service requires mobility support, the source ID and the source locator of the source communications device and the destination ID and the destination locator of the destination communications device may be obtained.

With reference to the second possible implementation of the first aspect, in a fifth possible implementation, the destination communications device includes at least an ID layer and a locator layer; and the obtaining, by the source communications device, a source locator of the source communications device and a destination locator of a destination communications device when determining that the current service does not require mobility support includes:

selecting, by the source communications device, one IP address from a preset address pool as the source locator, where the address pool is pre-allocated to the source communications device, and the address pool includes a plurality of IP addresses; and determining, by the source communications device by using a preset mapping relationship between a communications device identifier and an ID and a preset mapping relationship between an ID and a locator, a locator corresponding to the destination communications device identifier, and using the locator as the destination locator.

It can be learned from the foregoing descriptions that, in the foregoing method, when the destination communications device uses the communications protocol in the ID/locator split architecture, and the current service does not require mobility support, the source locator of the source communications device and the destination locator of the destination communications device may be obtained.

With reference to the second possible implementation of the first aspect, in a sixth possible implementation, the destination communications device includes at least an IP layer; and the obtaining, by the source communications device, a source locator of the source communications device and a destination locator of a destination communications device when determining that the current service does not require mobility support includes:

selecting, by the source communications device, one IP address from a preset address pool as the source locator, where the address pool is pre-allocated to the source communications device, and the address pool includes a plurality of IP addresses;

determining, by the source communications device by using a preset mapping relationship between a communications device identifier and an IP address, an IP address corresponding to the destination communications device identifier; and using, by the source communications device, the IP address corresponding to the destination communications device identifier as the destination locator.

It can be learned from the foregoing descriptions that, in the foregoing method, when the destination communications device uses the communications protocol in the ID/locator unsplit architecture, and the current service does not require mobility support, the source locator of the source communications device and the destination locator of the destination communications device may be obtained.

According to a second aspect, a service data packet encapsulation apparatus is provided, and includes:

a mobility support parameter obtaining unit, configured to obtain a mobility support parameter of a current service, where the mobility support parameter is used to indicate whether a corresponding service requires mobility support, the current service is run on a source communications device, and the source communications device includes at least an ID identifier layer and a locator layer;

a mobility support determining unit, configured to determine, based on the mobility support parameter of the current service, whether the current service requires mobility support; and a first encapsulation unit, configured to: obtain a source locator of the source communications device and a destination locator of a destination communications device when it is determined that the current service does not require mobility support, and perform, by using the source locator and the destination locator, locator layer encapsulation on a data packet that needs to be sent by the current service.

In actual application, performing ID layer encapsulation on a data packet mainly aims to ensure that on-going communication of a communications device is not interrupted in a moving process. For a data packet that needs to be sent by a service that does not require mobility support, a short interrupt occurring in a communication process does not significantly affect user experience. Therefore, in this embodiment of the present application, the source communications device does not perform ID layer encapsulation on the data packet that needs to be sent by the service that does not require mobility support. Therefore, in the apparatus in the present application, network overheads are reduced compared with the prior art in which five-layer encapsulation is performed on data packets that need to be sent by all services.

With reference to the second aspect, in a first possible implementation, the apparatus further includes:

a second encapsulation unit, configured to: obtain a source ID and the source locator of the source communications device and a destination ID and the destination locator of the destination communications device when the current service requires mobility support, perform, by using the source ID and the destination ID, ID layer encapsulation on the data packet that needs to be sent by the current service, and perform, by using the source locator and the destination locator, locator layer encapsulation on the data packet that needs to be sent by the current service.

It can be learned from the foregoing descriptions that, in the foregoing apparatus, when the current service requires mobility support, ID layer encapsulation and locator layer encapsulation may be performed on the data packet sent by the current service.

With reference to the second aspect or the first possible implementation of the second aspect, in a second possible implementation, the apparatus further includes:

a destination communications device identifier obtaining unit, configured to obtain a destination communications device identifier of the current service; and a communications protocol determining unit, configured to determine, based on the destination communications device identifier, a communications protocol used by the destination communications device, where the communications protocol is a TCP/IP communications protocol in an ID/locator split architecture or a TCP/IP communications protocol in an ID/locator unsplit architecture, a communications device using the TCP/IP communications protocol in the ID/locator split architecture includes at least an ID layer and a locator layer, and a communications device using the TCP/IP communications protocol in the ID/locator unsplit architecture includes at least an IP layer.

It can be learned from the foregoing descriptions that the communications protocol of the destination communications device may be determined by using the foregoing apparatus.

With reference to the second possible implementation of the second aspect, in a third possible implementation, the destination communications device includes at least an ID layer and a locator layer; and when obtaining the source ID and the source locator of the source communications device and the destination ID and the destination locator of the destination communications device when the current service requires mobility support, the second encapsulation unit is configured to:

select two IP addresses from a preset address pool as the source ID and the source locator respectively, where the address pool is pre-allocated to the source communications device, and the address pool includes a plurality of IP addresses;

determine, by using a preset mapping relationship between a communications device identifier and an ID, an ID corresponding to the destination communications device identifier, and use the ID as the destination ID; and determine, by using a preset mapping relationship between an ID and a locator, a locator corresponding to the destination ID, and use the locator as the destination locator.

It can be learned from the foregoing descriptions that, in the foregoing apparatus, when the destination communications device uses the communications protocol in the ID/locator split architecture, and the current service requires mobility support, the source ID and the source locator of the source communications device and the destination ID and the destination locator of the destination communications device may be obtained.

With reference to the second possible implementation of the second aspect, in a fourth possible implementation, the destination communications device includes at least an IP layer; and when obtaining the source ID and the source locator of the source communications device and the destination ID and the destination locator of the destination communications device when the current service requires mobility support, the second encapsulation unit is configured to:

select two IP addresses from a preset address pool as the source ID and the source locator respectively, where the address pool is pre-allocated to the source communications device, and the address pool includes a plurality of IP addresses;

obtain a locator of a proxy routing device, and determine, by using a preset mapping relationship between a communications device identifier and an IP address, an IP address corresponding to the destination communications device identifier, where the proxy routing device is located between the source communications device and the destination communications device, and supports the TCP/IP communications protocol in the ID/locator split architecture and the TCP/IP communications protocol in the ID/locator unsplit architecture; and use the IP address corresponding to the destination communications device identifier as the destination ID, and use the locator of the proxy routing device as the destination locator.

It can be learned from the foregoing descriptions that, in the foregoing apparatus, when the destination communications device uses the communications protocol in the ID/locator unsplit architecture, and the current service requires mobility support, the source ID and the source locator of the source communications device and the destination ID and the destination locator of the destination communications device may be obtained.

With reference to the second possible implementation of the second aspect, in a fifth possible implementation, the destination communications device includes at least an ID layer and a locator layer; and when obtaining the source locator of the source communications device and the destination locator of the destination communications device when the current service does not require mobility support, the first encapsulation unit is configured to:

select one IP address from a preset address pool as the source locator, where the address pool is pre-allocated to the source communications device, and the address pool includes a plurality of IP addresses; and determine, by using a preset mapping relationship between a communications device identifier and an ID and a preset mapping relationship between an ID and a locator, a locator corresponding to the destination communications device identifier, and use the locator as the destination locator.

It can be learned from the foregoing descriptions that, in the foregoing apparatus, when the destination communications device uses the communications protocol in the ID/locator split architecture, and the current service does not require mobility support, the source locator of the source communications device and the destination locator of the destination communications device may be obtained.

With reference to the second possible implementation of the first aspect, in a sixth possible implementation, the destination communications device includes at least an IP layer; and when obtaining the source locator of the source communications device and the destination locator of the destination communications device when the current service does not require mobility support, the first encapsulation unit is configured to:

select one IP address from a preset address pool as the source locator, where the address pool is pre-allocated to the source communications device, and the address pool includes a plurality of IP addresses;

determine, by using a preset mapping relationship between a communications device identifier and an IP address, an IP address corresponding to the destination communications device identifier; and use the IP address corresponding to the destination communications device identifier as the destination locator.

It can be learned from the foregoing descriptions that, in the foregoing apparatus, when the destination communications device uses the communications protocol in the ID/locator unsplit architecture, and the current service does not require mobility support, the source locator of the source communications device and the destination locator of the destination communications device may be obtained.

In actual application, performing ID layer encapsulation on a data packet mainly aims to ensure that on-going communication of a communications device is not interrupted in a moving process. For a data packet that needs to be sent by a service that does not require mobility support, a short interrupt occurring in a communication process does not significantly affect user experience. Therefore, in this embodiment of the present application, the source communications device does not perform ID layer encapsulation on the data packet that needs to be sent by the service that does not require mobility support. Therefore, in the method in the present application, network overheads are reduced compared with the prior art in which five-layer encapsulation is performed on data packets that need to be sent by all services.

BRIEF DESCRIPTION OF DRAWINGS

To describe the technical solutions in the embodiments of the present application or in the prior art more clearly, the following briefly describes the accompanying drawings required for describing the embodiments or the prior art.

DESCRIPTION OF EMBODIMENTS

The following describes the technical solutions in the embodiments of the present application with reference to the accompanying drawings in the embodiments of the present application.

Embodiment 1

Figure 1:
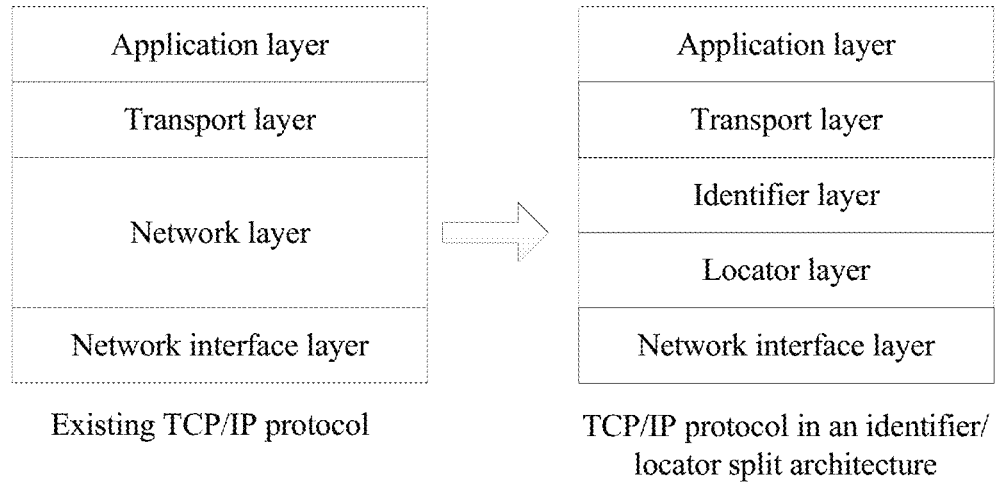
FIG. 1 is a schematic structural diagram of a TCP/IP protocol.

The TCP/IP protocol is a most basic communications protocol in Internet. As shown in FIG. 1, the TCP/IP protocol mainly includes four layers that are respectively an application layer, a transport layer, a network layer, and a network interface layer from top to bottom. Because in a TCP/IP protocol architecture shown in FIG. 1, an IP address of the network layer acts as both an identifier and a locator of a communications device, mobility, security, and multi-platform accessibility of the communications device are limited. In view of this, persons skilled in the art propose a TCP/IP protocol that is shown in FIG. 1 and that is in an architecture in which an ID and a locator are split. The TCP/IP protocol includes five layers that are respectively an application layer, a transport layer, an ID layer, a locator layer, and a network interface layer from top to bottom.

Figure 2:
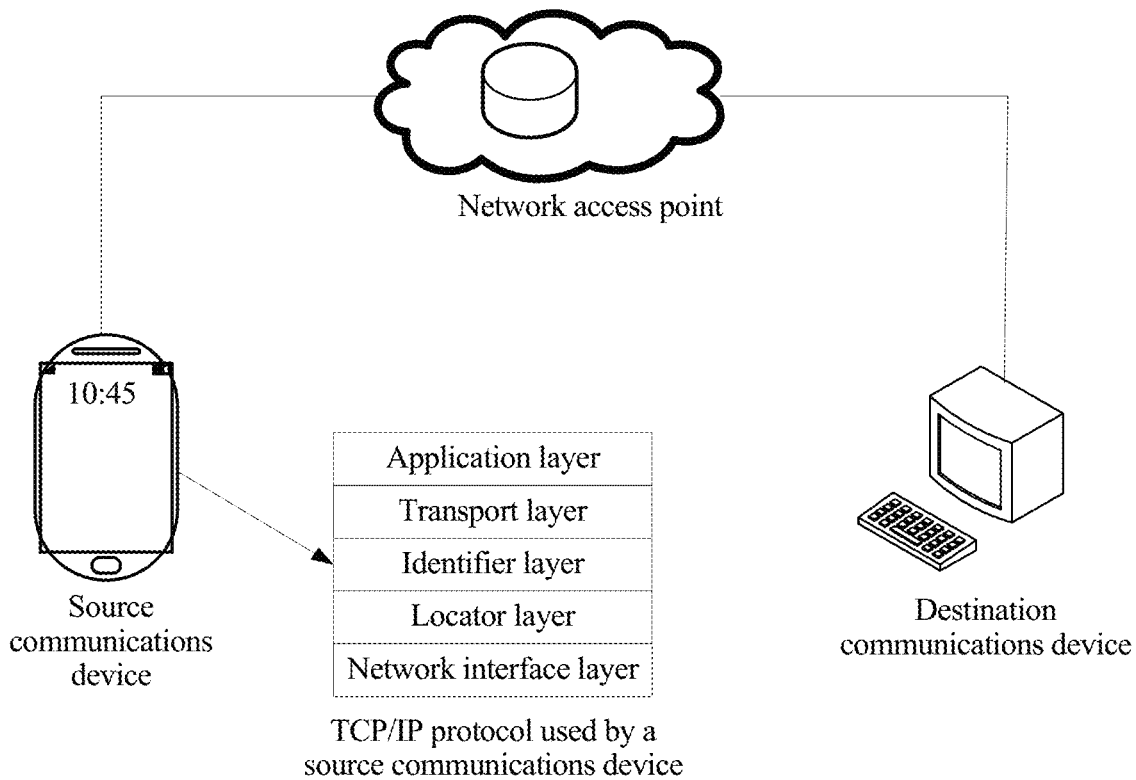
FIG. 2 is a schematic diagram of an application scenario according to the present application.

Based on the foregoing descriptions, the present application provides a service data packet encapsulation method. The method is mainly used to encapsulate a data packet that needs to be sent by a service of a source communications device using a five-layer ID/locator split TCP/IP communications protocol, and an application scenario of the method is shown in FIG. 2.

A source communications device communicates with a destination communications device by using an ID/locator split TCP/IP communications protocol. As shown in FIG. 1, the five-layer ID/locator split TCP/IP protocol includes an application layer, a transport layer, an ID layer, a locator layer, and a network interface layer from top to bottom.

The source communications device may be a network device or a terminal device in a communications system, and the destination communications device may also be a network device or a terminal device in a communications system.

In the embodiments of the present application, the terminal device may communicate with one or more core networks by using a radio access network (RAN). The terminal device may be user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device with a wireless communication function, a computing device or another processing device connected to a wireless modem, an in-vehicle device, a wearable device, a terminal device in a future 5G network, or the like.

The network device may be a device configured to communicate with the terminal device. For example, the network device may be a base transceiver station (BTS) in a Global System for Mobile Communications (GSM) system or a Code Division Multiple Access (CDMA) system, or may be a NodeB (NB) in a WCDMA system, or may be an evolved NodeB (eNB) in an LTE system. Alternatively, the network device may be a relay station, an access point, an in-vehicle device, a wearable device, a network-side device in a future 5G network, a network device in a future evolved public land mobile network (PLMN), or the like.

It should be understood that the technical solutions of the embodiments of the present application may be applied to various communications systems, such as: a GSM, a CDMA system, Wideband Code Division Multiple Access (WCDMA), a general packet radio service (GPRS), a Long Term Evolution (LTE) system, an LTE frequency division duplex (FDD) system, LTE time division duplex (TDD), a Universal Mobile Telecommunication System (UMTS), a Worldwide Interoperability for Microwave Access (WiMAX) communications system, and a future 5G communications system.

In the embodiments of the present application, the source communications device is set as a smartphone and the destination communications device is set as a personal computer merely as an example.

In the embodiments of the present application, a plurality of services can be run on the source communications device, for example, a video call service, a voice call service, a web page browsing service, a video downloading service, and a short message service. Some services require mobility support, to be specific, when the source communications device moves, there is a need to ensure that communication of a current service is not interrupted, for example, the video call service and the voice call service. Some services do not require mobility support, to be specific, when the source communications device moves, communication of a current service can be interrupted, for example, the web page browsing service, the video downloading service, and the short message service.

Figure 3:
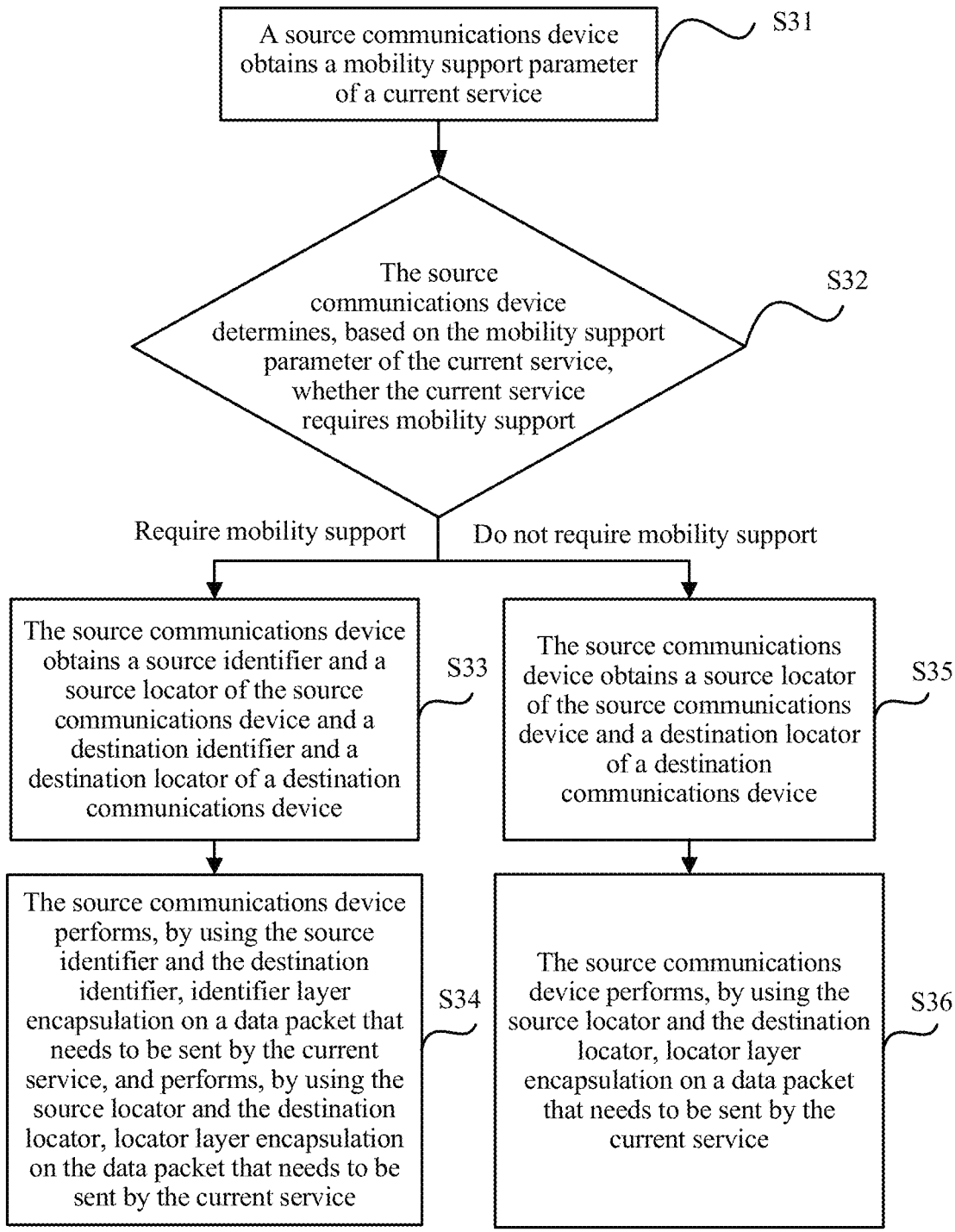
FIG. 3 is a schematic flowchart of a service data packet encapsulation method according to the present application.

In the embodiments of the present application, when a service currently running on the source communications device needs to send a data packet to the destination communications device, the source communications device first performs application layer encapsulation and transport layer encapsulation on the data packet, for example, by using a prior-art method. A service data packet encapsulation method provided in the present application is mainly used for ID layer encapsulation and locator layer encapsulation. As shown in FIG. 3, the method includes at least the following operations.

Operation S31: A source communications device obtains a mobility support parameter of a current service, where the mobility support parameter is used to indicate whether a corresponding service requires mobility support.

In actual application, an interface function is provided for each service inside the source communications device, to serve as a communications interface between an application layer and a transport layer, and a communications interface between the application layer and an ID layer. In this embodiment of the present application, the mobility support parameter may be set in the interface function of each service, and the interface function may be a socket (socket) interface function.

Optionally, in this embodiment of the present application, the mobility support parameter of the interface function may be 0 or 1. When a mobility support parameter of an interface function is 0, it represents that a corresponding service requires mobility support. When a mobility support parameter of an interface function is 1, it represents that a corresponding service does not require mobility support.

Optionally, the mobility support parameter of the interface function may be Mobility Management Require (MM Require) and Mobility Management No Require (MM No Require). When a mobility support parameter of an interface function is MM Require, it represents that a corresponding service requires mobility support. When a mobility support parameter of an interface function is MM No Require, it represents that a corresponding service does not require mobility support.

Operation S32: The source communications device determines, based on the mobility support parameter of the current service, whether the current service requires mobility support, and if the current service requires mobility support, performs operation S33, or otherwise, performs operation S35.

Operation S33: The source communications device obtains a source ID and a source locator of the source communications device and a destination ID and a destination locator of a destination communications device.

Operation S34: The source communications device performs, by using the source ID and the destination ID, ID layer encapsulation on a data packet that needs to be sent by the current service, and performs, by using the source locator and the destination locator, locator layer encapsulation on the data packet that needs to be sent by the current service.

Figures 4, 5, 6:
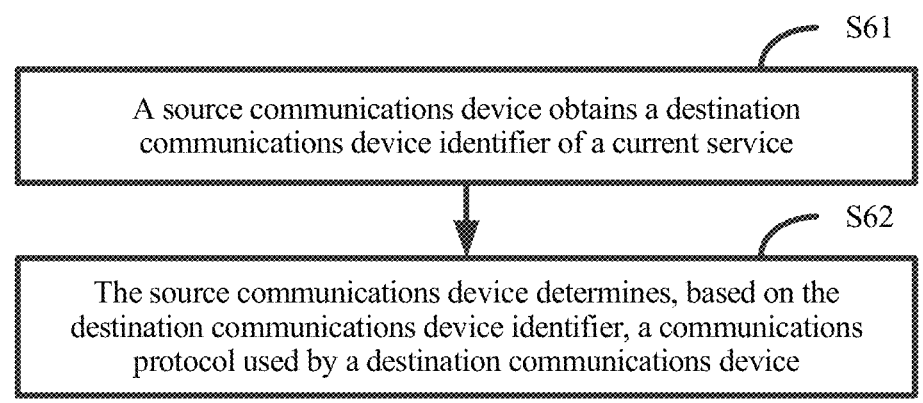
FIG. 4 is a schematic diagram of an encapsulated data packet according to the present application.
FIG. 5 is another schematic diagram of an encapsulated data packet according to the present application.
FIG. 6 is another schematic flowchart of a service data packet encapsulation method according to the present application.

In this embodiment of the present application, the source ID is an identifier of the source communications device, and the destination ID is an identifier of the destination communications device. An identifier is mainly added to a data packet at an ID layer, and therefore, the data packet is mainly encapsulated at the ID layer by using the source ID and the destination ID. Likewise, the source locator is a locator of the source communications device, and the destination locator is a locator of the destination communications device. A locator is mainly added to a data packet at a locator layer, and therefore, the data packet is mainly encapsulated at the locator layer by using the source locator and the destination locator. An encapsulated data packet is shown in FIG. 4.

ID layer encapsulation and locator layer encapsulation performed on the data packet are completed by using operations S31 to S34. In this case, the source communications device may continue to perform network interface layer encapsulation on the data packet, and send an encapsulated data packet to the destination communications device by using a current network access point (referring to FIG. 2). After receiving the data packet sent by the source communications device, the destination communications device may obtain payload information in the data packet by successively performing network interface layer decapsulation, locator layer decapsulation, ID layer decapsulation, transport layer decapsulation, and application layer decapsulation on the data packet.

Operation S35: The source communications device obtains a source locator of the source communications device and a destination locator of a destination communications device.

Operation S36: The source communications device performs, by using the source locator and the destination locator, locator layer encapsulation on a data packet that needs to be sent by the current service.

In this embodiment of the present application, an encapsulated data packet is shown in FIG. 5.

Locator layer encapsulation performed on the data packet is completed by using operations S31, S32, S35, and S36. In this case, the source communications device may continue to perform network interface layer encapsulation on the data packet, and send an encapsulated data packet to the destination communications device by using a current network access point (referring to FIG. 2). After receiving the data packet sent by the source communications device, the destination communications device may obtain payload information in the data packet by successively performing network interface layer decapsulation, locator layer decapsulation, transport layer decapsulation, and application layer decapsulation on the data packet.

In actual application, performing ID layer encapsulation on a data packet mainly aims to ensure that on-going communication of a communications device is not interrupted in a moving process. For a data packet that needs to be sent by a service that does not require mobility support, a short interrupt occurring in a communication process does not significantly affect user experience. Therefore, in this embodiment of the present application, the source communications device does not perform ID layer encapsulation on the data packet that needs to be sent by the service that does not require mobility support. Therefore, in the method in the present application, network overheads are reduced compared with the prior art in which five-layer encapsulation is performed on data packets that need to be sent by all services.

Embodiment 2

In actual application, a destination communications device may use a TCP/IP communications protocol in an ID/locator split architecture, or may use a TCP/IP communications protocol in an ID/locator unsplit architecture (namely, a conventional four-layer TCP/IP communications protocol). For a destination communications device using the ID/locator split architecture and a destination communications device using the ID/locator unsplit architecture, different manners of obtaining a destination ID and a destination locator by a source communications device are used. Therefore, before encapsulating a data packet, the source communications device needs to first determine a TCP/IP communications protocol architecture used by the destination communications device.

In this embodiment of the present application, as shown in FIG. 6, the communications protocol architecture of the destination communications device may be obtained in the following manner:

Operation S61: A source communications device obtains a destination communications device identifier of a current service.

In this embodiment of the present application, the destination communications device identifier obtained by the source communications device varies with a service. For example, when the service is a web page browsing service, the destination communications device identifier obtained by the source communications device may be a domain name of the destination communications device.

Operation S62: The source communications device determines, based on the destination communications device identifier, a communications protocol used by a destination communications device.

In this embodiment of the present application, a mapping system is provided, and the mapping system provides a plurality of mapping relationships. By using the mapping relationships in the mapping system, the source communications device may implement operation S62 of determining, based on the destination communications device identifier, the communications protocol used by the destination communications device. The present application provides three implementations.

A First Implementation:

For a communications device using a TCP/IP communications protocol in an ID/locator split architecture, the mapping system stores a mapping relationship between the communications device identifier and an ID and a mapping relationship between an ID and a locator. The mapping system may store the mapping relationships in the following manner: communications device identifier→ID→locator.

For a communications device using a TCP/IP communications protocol in an ID/locator unsplit architecture, the mapping system stores a mapping relationship between the communications device identifier and an IP address. The mapping system may store the mapping relationship in the following manner: communications device identifier→IP address.

More specifically, in the first implementation, a process of obtaining the protocol of the destination communications device by the source communications device is as follows: First, the source communications device sends the destination communications device identifier to the mapping system. Then, the mapping system obtains, by using the mapping relationship between a communications device identifier and an ID, an ID corresponding to the destination communications device identifier, obtains, by using the mapping relationship between an ID and a locator, a locator corresponding to the ID, and finally returns the ID and the locator to the source communications device. Alternatively, the mapping system obtains, by using the mapping relationship between a communications device identifier and an IP address, an IP address corresponding to the destination communications device identifier, and finally returns the IP address to the source communications device.

When obtaining two pieces of data returned by the mapping system, namely, the ID and the locator, the source communications device may determine that the destination communications device uses the TCP/IP communications protocol in the ID/locator split architecture. When obtaining one piece of data returned by the mapping system, namely, the IP address, the source communications device determines that the destination communications device uses the TCP/IP communications protocol in the ID/locator unsplit architecture.

In this embodiment of the present application, when the current service is a web page browsing service, the destination communications device identifier that is of the current service and that is obtained by the source communications device is a specific domain name. The mapping relationship between a communications device identifier and an ID and the mapping relationship between a communications device identifier and an IP address may be stored in a domain name server (DNS), and the mapping relationship between an ID and a locator may be stored in an identifier/locator mapping system (ILMS). The mapping system provided in the present application includes the DNS and the ILMS.

A Second Implementation:

For a communications device using a TCP/IP communications protocol in an ID/locator split architecture, the mapping system stores a mapping relationship between the communications device identifier and an ID, a mapping relationship between an ID and a locator, and a mapping relationship between an ID and a communications protocol architecture of a communications device. The communications protocol architecture herein is an architecture in which an ID and a locator are split. The mapping system may store the mapping relationships in the following manners: communications device identifier→ID→ID/locator split communications protocol architecture, and ID→locator.

For a communications device using a TCP/IP communications protocol in an ID/locator unsplit architecture, the mapping system stores a mapping relationship between the communications device identifier and an IP address and a mapping relationship between an IP address and a communications protocol architecture of a communications device. The communications protocol architecture herein is an architecture in which an ID and a locator are not split. The mapping system may store the mapping relationships in the following manner: communications device identifier→IP address→ID/locator unsplit communications protocol architecture.

More specifically, in the second optional implementation, a process of obtaining the protocol of the destination communications device by the source communications device is as follows: First, the source communications device sends the destination communications device identifier to the mapping system. The mapping system may map the destination communications device identifier to an ID based on the mapping relationship between a communications device identifier and an ID, map the ID to a communications protocol in an ID/locator split architecture by using the mapping relationship between an ID and a communications protocol in an ID/locator split architecture, encapsulate the ID mapped to the destination communications device identifier to obtain an ID response message, and add a label of the ID/locator split architecture to the ID response message. The ID response message includes at least an ID corresponding to the destination communications device, and the label of the ID/locator split architecture.

Alternatively, the mapping system maps the destination communications device identifier to an IP address based on the mapping relationship between a communications device identifier and an IP address, maps the IP address to a communications protocol in an ID/locator unsplit architecture by using the mapping relationship between an IP address and a communications protocol in an ID/locator unsplit architecture, encapsulates the IP address mapped to the destination communications device identifier to obtain an IP response message, and adds a label of the ID/locator unsplit architecture to the IP response message. The IP response message includes at least an IP address corresponding to the destination communications device, and the label of the ID/locator unsplit architecture.

Finally, the mapping system sends the ID response message or the IP response message to the source communications device. The source communications device may determine, based on the label in the ID response message, that the destination communications device uses the TCP/IP communications protocol in the ID/locator split architecture, or the source communications device may determine, based on the label in the IP response message, that the destination communications device uses the TCP/IP communications protocol in the ID/locator unsplit architecture.

A Third Implementation:

For a communications device using a TCP/IP protocol in an ID/locator split architecture, the mapping system stores a mapping relationship between the communications device identifier and a TCP/IP communications protocol architecture, a mapping relationship between a communications device identifier and an ID, and a mapping relationship between an ID and a locator. The mapping system may store the mapping relationships in the following manners: communications device identifier→ID→locator, and communications device identifier→ID/locator split communications protocol architecture.

For a communications device using a TCP/IP protocol in an ID/locator unsplit architecture, the mapping system stores a mapping relationship between the communications device identifier and a TCP/IP communications protocol architecture and a mapping relationship between a communications device identifier and an IP address. The mapping system may store the mapping relationships in the following manners: communications device identifier→IP address, and communications device identifier→ID/locator unsplit communications protocol architecture.

More specifically, in the third optional implementation, a process of obtaining the protocol of the destination communications device by the source communications device is as follows: The source communications device may send the destination communications device identifier to the mapping system. The mapping system may determine, by using the mapping relationship that is between a communications device identifier and a TCP/IP protocol architecture and that is stored in the mapping system, the TCP/IP communications protocol architecture used by the destination communications device, and return the architecture to the source communications device.

It can be learned from the foregoing descriptions that the TCP/IP protocol architecture used by the destination communications device may be determined by using the foregoing method provided in the present application.

Embodiment 3

If the source communications device determines, in any one of the three implementations provided in Embodiment 2, that the destination communications device uses the TCP/IP communications protocol in the ID/locator split architecture, the source communications device first performs application layer encapsulation and transport layer encapsulation on the data packet that needs to be sent by the currently running service, and then determines, by using operations S31 and S32 in Embodiment 1, whether the current service requires mobility support.

Figure 7:
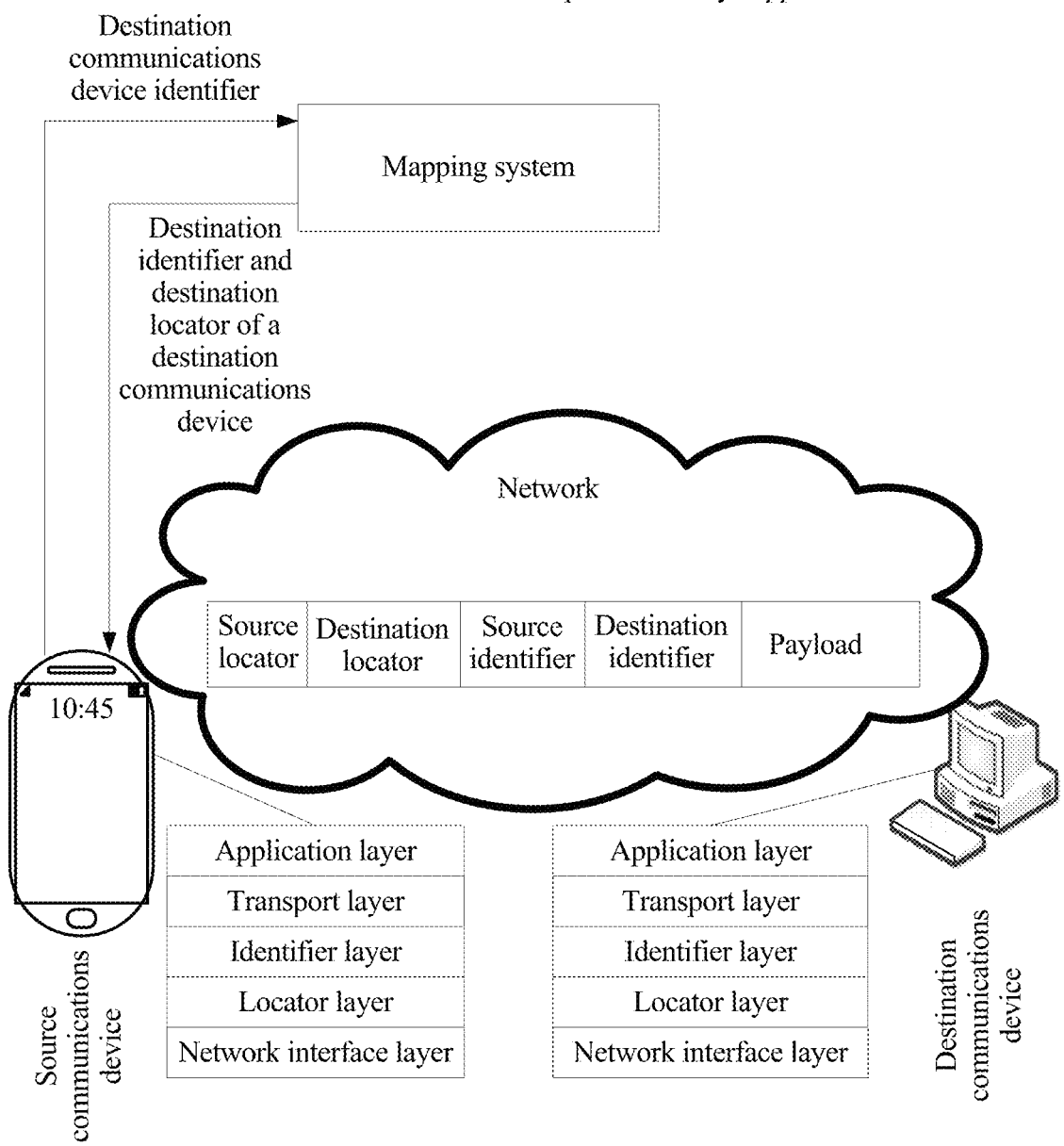
FIG. 7 is a schematic diagram of an application scenario according to the present application.

1. If the source communications device determines that the current service requires mobility support, an application scenario is shown in FIG. 7. Operation S33 in Embodiment 1 that the source communications device obtains a source ID and a source locator of the source communications device and a destination ID and a destination locator of a destinations communications device is as follows:

The source communications device selects two IP addresses from a preset address pool as the source ID and the source locator respectively.

In this embodiment of the present application, the address pool is pre-allocated to the source communications device, the address pool includes a plurality of IP addresses, and the IP address may be an IP version 6 (IPv6) address or an IP version 4 (IPv4) address. In this embodiment of the present application, the IP addresses in the address pool may be of a plurality of types such as an encrypted type and an unencrypted type. The source communications device may select an IP address based on a requirement for sending a service data packet. For example, if a service requires that an IP address is encrypted, an encrypted IP address may be selected as the source ID and the source locator.

The source communications device determines, by using a preset mapping relationship between a communications device identifier and an ID, an ID corresponding to the destination communications device identifier, and uses the ID as the destination ID. The source communications device determines, by using a preset mapping relationship between an ID and a locator, a locator corresponding to the destination ID, and uses the locator as the destination locator.

In the first implementation of Embodiment 2, the source communications device may directly use the ID returned by the mapping system as the destination ID, and certainly, the returned ID herein is obtained by using the mapping relationship between a communications device identifier and an ID. The source communications device may directly use the locator returned by the mapping system as the destination locator, and certainly, the returned locator herein is obtained by using the mapping relationship between an ID and a locator.

In the second implementation of Embodiment 2, the source communications device may use the ID in the ID response message as the destination ID, and then send the destination ID to the mapping system. The mapping system may obtain, by using the mapping relationship between an ID and a locator, a locator corresponding to the destination ID, and return the locator to the source communications device. The source communications device uses the returned locator as the destination locator.

In the third implementation of Embodiment 2, the source communications device may send the destination communications device identifier to the mapping system. The mapping system may obtain, by using the mapping relationship that is between a communications device identifier and an ID and that is stored in the mapping system, the ID corresponding to the destination communications device identifier, then obtain, by using the mapping relationship between an ID and a locator, a locator corresponding to the ID, and finally return the ID and the locator to the source communications device. The source communications device uses the ID returned by the mapping system as the destination ID, and uses the returned locator as the destination locator.

Finally, operation S34 in Embodiment 1 is performed: The source communications device performs, by using the source ID and the destination ID, ID layer encapsulation on a data packet that needs to be sent by the current service, performs, by using the source locator and the destination locator, locator layer encapsulation on the data packet that needs to be sent by the current service, performs network interface layer encapsulation, and sends an encapsulated data packet to the destination communications device by using a current network access point.

Figure 8:
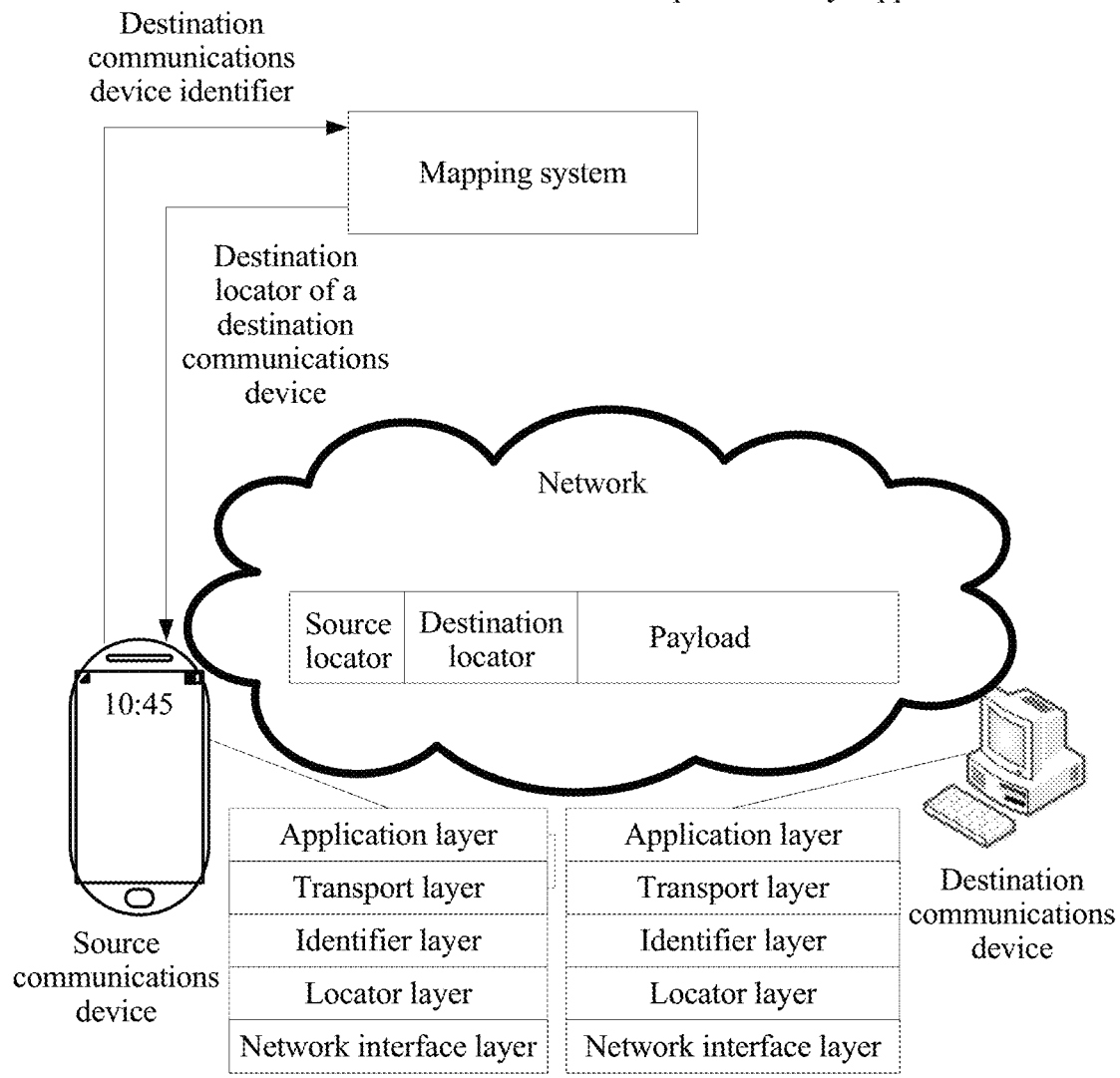
FIG. 8 is another schematic diagram of an application scenario according to the present application.

2. If the source communications device determines that a service sending a data packet does not require mobility support, an application scenario is shown in FIG. 8. Operation S35 in Embodiment 1 that the source communications device obtains a source locator of the source communications device and a destination locator of a destination communications device may include:

The source communications device may select one IP address from a preset address pool as the source locator.

The source communications device determines, by using a preset mapping relationship between a communications device identifier and an ID and a preset mapping relationship between an ID and a locator, a locator corresponding to the destination communications device identifier, and uses the locator as the destination locator.

In the first implementation of Embodiment 2, the source communications device may directly use the locator returned by the mapping system as the destination locator. The returned locator herein is obtained after the communications device identifier is mapped to the ID by using the mapping relationship between a communications device identifier and an ID, and then the ID is mapped to the locator by using the mapping relationship between an ID and a locator.

In the second implementation of Embodiment 2, the source communications device may send the ID in the ID response message to the mapping system. The mapping system may obtain, by using the mapping relationship between an ID and a locator, a locator corresponding to the ID, and return the locator to the source communications device. The source communications device uses the returned locator as the destination locator.

In the third implementation of Embodiment 2, the source communications device may send the destination communications device identifier to the mapping system. The mapping system may map the destination communications device identifier to the ID by using the mapping relationship that is between a communications device identifier and an ID and that is stored in the mapping system, then map the ID to the destination locator by using the mapping relationship between an ID and a locator, and finally return the locator to the source communications device. The source communications device uses the locator returned by the mapping system as the destination locator.

Finally, operation S36 in Embodiment 1 is performed: The source communications device performs, by using the source locator and the destination locator, locator layer encapsulation on a data packet that needs to be sent by the current service, performs network interface layer encapsulation, and sends an encapsulated data packet to the destination communications device by using a current network access point.

It can be learned from the foregoing descriptions that, in the foregoing method, when the destination communications device uses the TCP/IP communications protocol in the ID/locator split architecture, the source communications device may obtain the source ID, the source locator, the destination ID, and the destination locator.

Embodiment 4

First, it should be noted that in the prior art, to facilitate communication between the communications device using the TCP/IP communications protocol in the ID/locator split architecture and the communications device using the TCP/IP communications protocol in the ID/locator unsplit architecture, a proxy (a proxy routing device) is usually disposed between the communications devices using the foregoing two different communications protocols. The proxy supports both the TCP/IP communications protocol in the ID/locator split architecture and a conventional four-layer TCP/IP communications protocol.

In this embodiment of the present application, if the source communications device determines, in the three implementations provided in Embodiment 2, that the destination communications device uses the TCP/IP communications protocol in the ID/locator unsplit architecture, the source communications device first performs application layer encapsulation and transport layer encapsulation on the data packet that needs to be sent by the currently running service, and then determines, by using operations S31 and S32 in Embodiment 1, whether the current service requires mobility support.

Figure 9A:
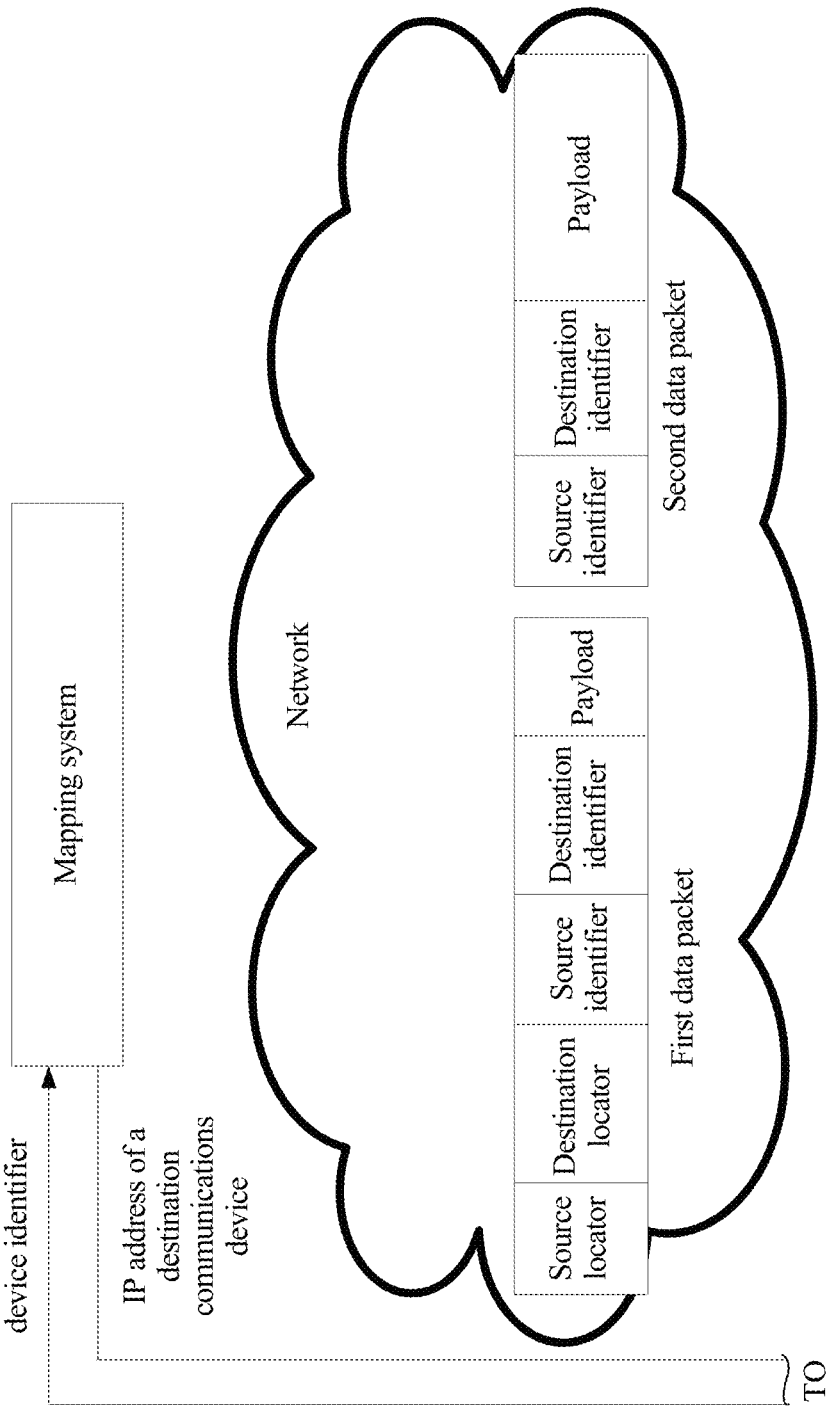
FIG. 9A and FIG. 9B are still another schematic diagram of an application scenario according to the present application.
Figure 9B:
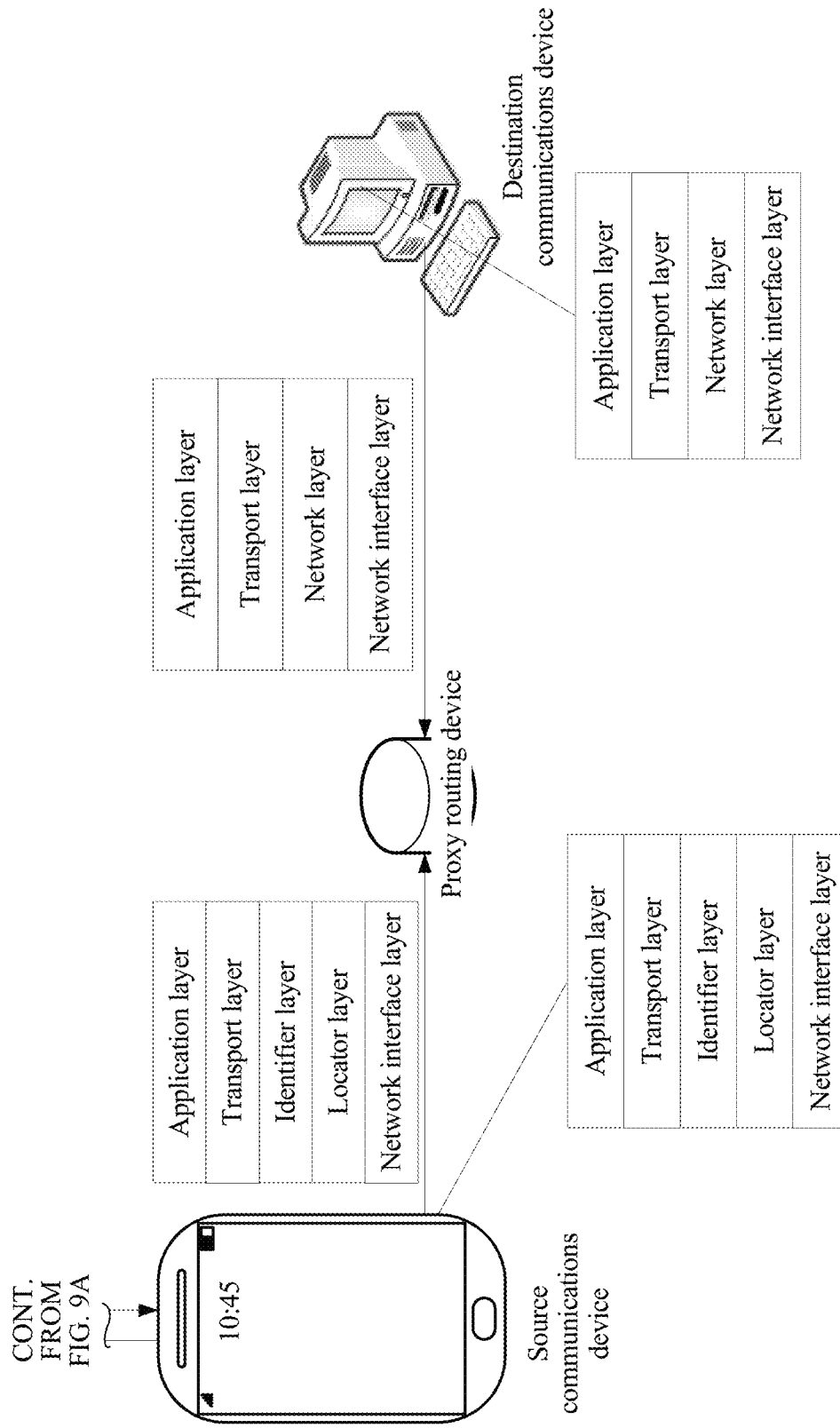

1. If the source communications device determines that the current service requires mobility support, an application scenario is shown in FIG. 9A and FIG. 9B. Operation S33 in Embodiment 1 that the source communications device obtains a source ID and a source locator of the source communications device and a destination ID and a destination locator of a destinations communications device is as follows:

The source communications device selects two IP addresses from a preset address pool as the source ID and the source locator respectively.

The source communications device obtains a locator of a proxy between the source communications device and the destination communications device.

In this embodiment of the present application, the source communications device may send a locator request to the proxy, and the proxy returns the locator of the proxy to the source communications device after receiving the request.

The source communications device determines, by using a preset mapping relationship between a communications device identifier and an IP address, an IP address corresponding to the destination communications device identifier.

In the first implementation of Embodiment 2, the source communications device uses the IP address returned by the mapping system as the IP address corresponding to the destination communications device, and certainly, the IP address is obtained based on the mapping relationship that is between a communications device identifier and an IP address and that is in the mapping system.

In the second implementation of Embodiment 2, the source communications device uses the IP address in the IP response message as the IP address corresponding to the destination communications device, and certainly, the IP address is obtained based on the mapping relationship that is between a communications device identifier and an IP address and that is in the mapping system.

In the third implementation of Embodiment 2, the source communications device may send the destination communications device identifier to the mapping system. The mapping system may determine, by using the mapping relationship that is between a communications device identifier and an IP address and that is stored in the mapping system, the IP address corresponding to the destination communications device.

Finally, the source communications device uses the IP address in the IP response message as the destination ID, and uses the locator of the proxy as the destination locator.

Finally, operation S34 in Embodiment 1 is performed: The source communications device performs, by using the source ID and the destination ID, ID layer encapsulation on a data packet that needs to be sent by the current service; performs, by using the source locator and the destination locator, locator layer encapsulation on the data packet that needs to be sent by the current service, where for an encapsulated data packet, refer to a first data packet in FIG. 9A and FIG. 9B; and finally performs network interface layer encapsulation, and sends an encapsulated data packet to the destination communications device by using a current network access point.

It should be noted that, because the locator of the proxy is encapsulated into the data packet sent by the source communications device, the first data packet is to be sent to the proxy device. After receiving the first data packet, the proxy device first decapsulates the first data packet to obtain payload information in the first data packet, and then uses a source ID in the first data packet as a source IP address and uses a destination ID as a destination IP address to encapsulate the payload. For an encapsulated data packet, refer to a second data packet in FIG. 9A and FIG. 9B.

Finally, the encapsulated data packet is sent to the destination communications device by using the network access point.

Figure 10:
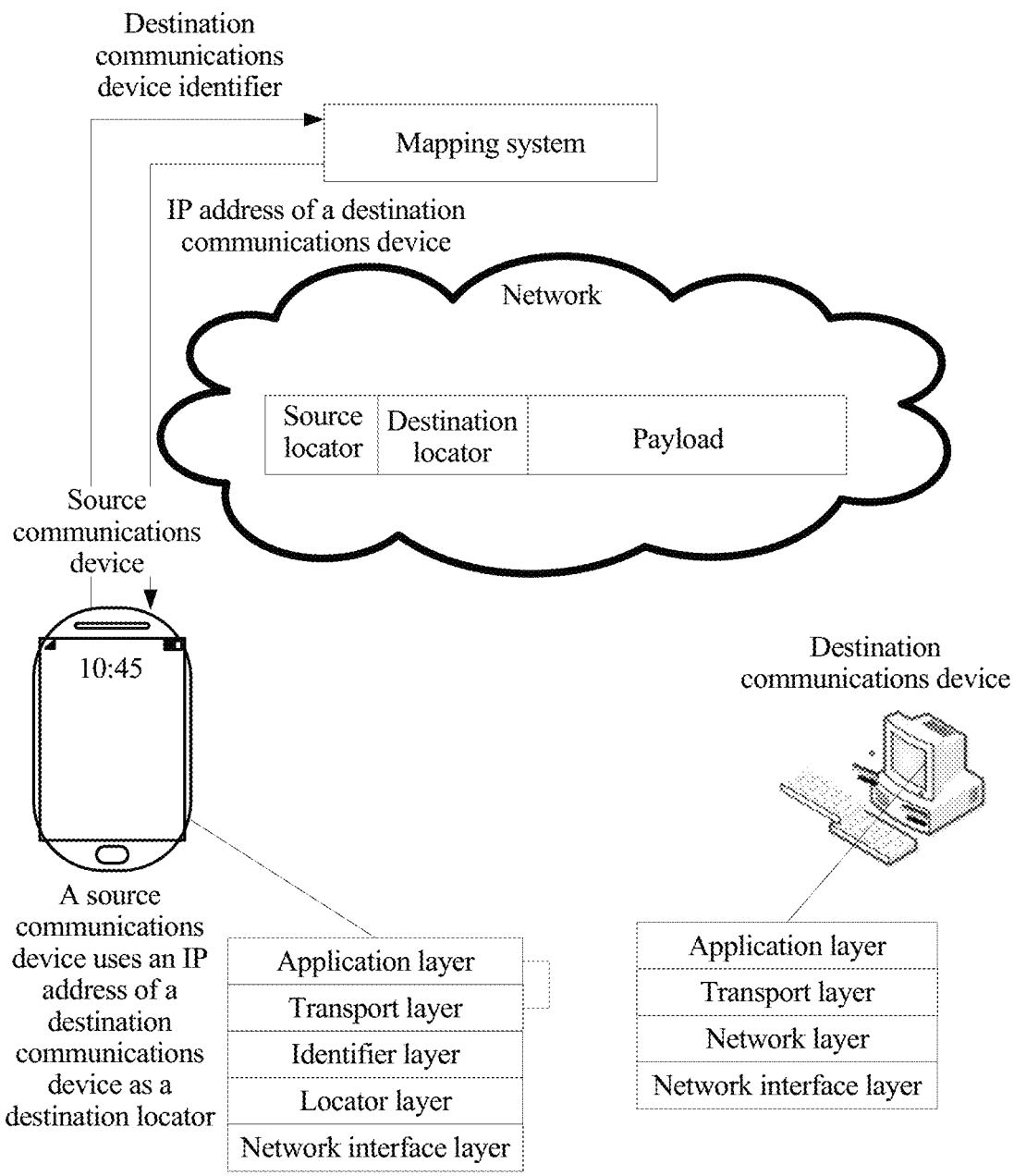
FIG. 10 is yet another schematic diagram of an application scenario according to the present application.

2. If the source communications device determines that the current service does not require mobility support, an application scenario may be shown in FIG. 10. Operation S35 in Embodiment 1 that the source communications device obtains a source locator of the source communications device and a destination locator of a destination communications device may include:

The source communications device selects one IP address from a preset address pool as the source locator.

The source communications device determines, by using a preset mapping relationship between a communications device identifier and an IP address, an IP address corresponding to the destination communications device identifier.

In the first implementation of Embodiment 2, the source communications device uses the IP address returned by the mapping system as the IP address corresponding to the destination communications device identifier, and certainly, the IP address is obtained by the mapping system based on the mapping relationship between a communications device identifier and an IP address.

In the second implementation of Embodiment 2, the source communications device uses the IP address in the IP response message as the IP address corresponding to the destination communications device identifier, and certainly, the IP address in the IP response message is obtained by the mapping system based on the mapping relationship between a communications device identifier and an IP address.

In the third implementation of Embodiment 2, the source communications device may send the destination communications device identifier to the mapping system. The mapping system may obtain, based on the mapping relationship between a communications device identifier and an IP address, the IP address corresponding to the destination communications device identifier, and return the IP address to the source communications device.

The source communications device uses the IP address corresponding to the destination communications device identifier as the destination locator.

Finally, operation S36 in Embodiment 1 is performed: The source communications device performs, by using the source locator and the destination locator, locator layer encapsulation on a data packet that needs to be sent by the current service, performs network interface layer encapsulation, and sends an encapsulated data packet to the destination communications device by using a current network access point.

It should be noted that the mapping relationships provided by the mapping system in the present application are not limited to the foregoing three implementations, and may further include another similar mapping relationship. Likewise, the communications protocol of the destination communications device protocol, the source ID, the source locator, the destination ID, the destination locator, and the like may also be obtained by using the another mapping relationship. This is not limited in the present application.

It can be learned from the foregoing descriptions that, in the foregoing method, when the destination communications device uses the TCP/IP communications protocol in the ID/locator unsplit architecture, the source communications device may obtain the source ID, the source locator, the destination ID, and the destination locator.

Embodiment 5

Figure 11:
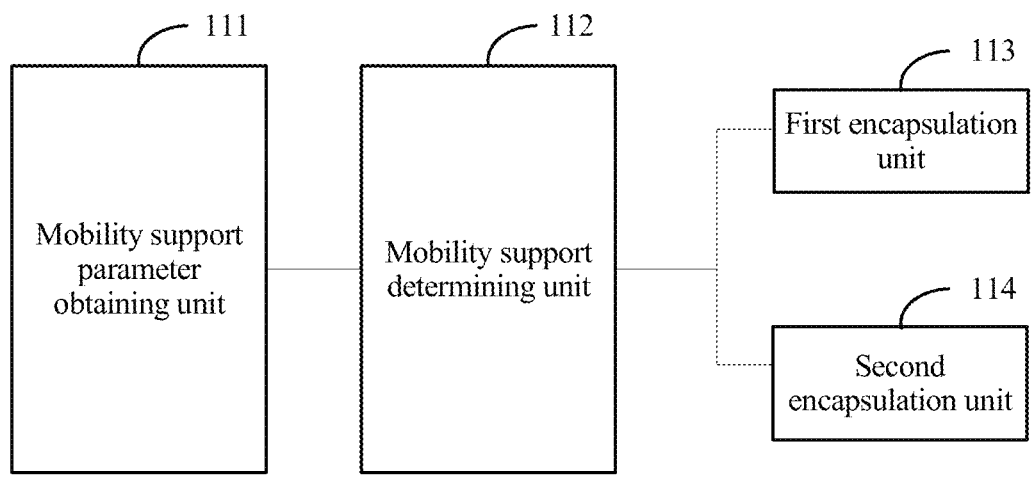
FIG. 11 is a schematic structural diagram of a service data packet encapsulation apparatus according to the present application.

Corresponding to the foregoing service data packet encapsulation method embodiment, the present application further provides a service data packet encapsulation apparatus. As shown in FIG. 11, the apparatus includes at least:

a mobility support parameter obtaining unit 111, configured to obtain a mobility support parameter of a current service, where the mobility support parameter is used to indicate whether a corresponding service requires mobility support, the current service is run on a source communications device, and the source communications device includes at least an ID identifier layer and a locator layer;

a mobility support determining unit 112, configured to determine, based on the mobility support parameter of the current service, whether the current service requires mobility support; and a first encapsulation unit 113, configured to: obtain a source locator of the source communications device and a destination locator of a destination communications device when it is determined that the current service does not require mobility support, and perform, by using the source locator and the destination locator, locator layer encapsulation on a data packet that needs to be sent by the current service.

Optionally, the destination communications device includes at least an ID layer and a locator layer. When obtaining the source locator of the source communications device and the destination locator of the destination communications device when the current service does not require mobility support, the first encapsulation unit 113 is configured to: select one IP address from a preset address pool as the source locator, where the address pool is pre-allocated to the source communications device, and the address pool includes a plurality of IP addresses; and determine, by using a preset mapping relationship between a communications device identifier and an ID and a preset mapping relationship between an ID and a locator, a locator corresponding to the destination communications device identifier, and use the locator as the destination locator.

Optionally, the destination communications device includes at least an IP layer. When obtaining the source locator of the source communications device and the destination locator of the destination communications device when the current service does not require mobility support, the first encapsulation unit is configured to: select one IP address from a preset address pool as the source locator, where the address pool is pre-allocated to the source communications device, and the address pool includes a plurality of IP addresses; determine, by using a preset mapping relationship between a communications device identifier and an IP address, an IP address corresponding to the destination communications device identifier; and use the IP address corresponding to the destination communications device identifier as the destination locator.

The apparatus further includes a second encapsulation unit 114, configured to: obtain a source ID and the source locator of the source communications device and a destination ID and the destination locator of the destination communications device when the current service requires mobility support, perform, by using the source ID and the destination ID, ID layer encapsulation on the data packet that needs to be sent by the current service, and perform, by using the source locator and the destination locator, locator layer encapsulation on the data packet that needs to be sent by the current service.

Optionally, the destination communications device includes at least an ID layer and a locator layer. When obtaining the source ID and the source locator of the source communications device and the destination ID and the destination locator of the destination communications device when the current service requires mobility support, the second encapsulation unit 114 is configured to: select two IP addresses from a preset address pool as the source ID and the source locator respectively, where the address pool is pre-allocated to the source communications device, and the address pool includes a plurality of IP addresses; determine, by using a preset mapping relationship between a communications device identifier and an ID, an ID corresponding to the destination communications device identifier, and use the ID as the destination ID; and determine, by using a preset mapping relationship between an ID and a locator, a locator corresponding to the destination ID, and use the locator as the destination locator.

Optionally, the destination communications device includes at least an IP layer. When obtaining the source ID and the source locator of the source communications device and the destination ID and the destination locator of the destination communications device when the current service requires mobility support, the second encapsulation unit is configured to: select two IP addresses from a preset address pool as the source ID and the source locator respectively, where the address pool is pre-allocated to the source communications device, and the address pool includes a plurality of IP addresses; obtain a locator of a proxy routing device, and determine, by using a preset mapping relationship between a communications device identifier and an IP address, an IP address corresponding to the destination communications device identifier, where the proxy routing device is located between the source communications device and the destination communications device, and supports a TCP/IP communications protocol in an ID/locator split architecture and a TCP/IP communications protocol in an ID/locator unsplit architecture; and use the IP address corresponding to the destination communications device identifier as the destination ID, and use the locator of the proxy routing device as the destination locator.

Optionally, the apparatus may further include: a destination communications device identifier obtaining unit, configured to obtain a destination communications device identifier of the current service; and a communications protocol determining unit, configured to determine, based on the destination communications device identifier, a communications protocol used by the destination communications device. The communications protocol is the TCP/IP communications protocol in the ID/locator split architecture or the TCP/IP communications protocol in the ID/locator unsplit architecture, a communications device using the TCP/IP communications protocol in the ID/locator split architecture includes at least an ID layer and a locator layer, and a communications device using the TCP/IP communications protocol in the ID/locator unsplit architecture includes at least an IP layer.

In actual application, performing ID layer encapsulation on a data packet mainly aims to ensure that on-going communication of a communications device is not interrupted in a moving process. For a data packet that needs to be sent by a service that does not require mobility support, a short interrupt occurring in a communication process does not significantly affect user experience. Therefore, in this embodiment of the present application, the source communications device does not perform ID layer encapsulation on the data packet that needs to be sent by the service that does not require mobility support. Therefore, in the apparatus in the present application, network overheads are reduced compared with the prior art in which five-layer encapsulation is performed on data packets that need to be sent by all services.

Embodiment 6

Figure 12:
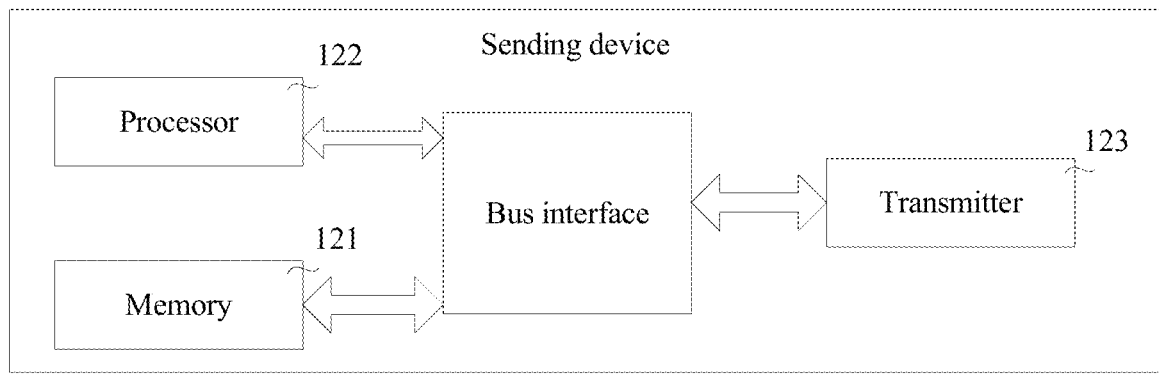
FIG. 12 is a schematic structural diagram of a sending device according to the present application.

Based on a same concept, as shown in FIG. 12, the present application further provides a sending device, including a memory 121, a processor 122, and a transmitter 123.

The memory 121 is configured to store a program and an instruction.

The processor 122 is configured to: execute the program and the instruction stored in the memory, to perform the following operations:

obtaining a mobility support parameter of a current service, where the mobility support parameter is used to indicate whether a corresponding service requires mobility support, and the source communications device includes at least an ID identifier layer and a locator layer;

determining, based on the mobility support parameter of the current service, whether the current service requires mobility support; and obtaining a source locator of the source communications device and a destination locator of a destination communications device when determining that the current service does not require mobility support, and performing, by using the source locator and the destination locator, locator layer encapsulation on a data packet that needs to be sent by the current service.

Optionally, for a method for obtaining a destination ID, a destination locator, a source ID, and a source locator, and encapsulating a data packet, refer to the descriptions in the foregoing embodiments. Details are not described herein again.

The transmitter 123 is configured to send an encapsulated data packet.

A bus architecture may include any quantities of interconnected buses and bridges. Various circuits of one or more processors represented by the processor and a memory represented by the memory are linked. The bus architecture may further link various other circuits such as a peripheral device, a regulator, and a power management circuit. These are commonly known in the art, and therefore, are not further described in this specification. A bus interface provides an interface. A transceiver may be a plurality of elements including a transmitter and a transceiver, and provide a unit configured to communicate with various other apparatuses on a transmission medium. The processor is responsible for managing the bus architecture and normal processing, and the memory may store data used when the processor performs an operation.

Persons skilled in the art should understand that the embodiments of the present application may be provided as a method, a system, or a computer program product. Therefore, the present application may use a form of hardware only embodiments, software only embodiments, or embodiments with a combination of software and hardware. Moreover, the present application may use a form of a computer program product that is implemented on one or more computer-usable storage media (including but not limited to a disk memory, a CD-ROM, an optical memory, and the like) that include computer-usable program code.

The present application is described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a function in one or more processes in the flowcharts and/or in one or more blocks in the block diagrams.

These computer program instructions may be stored in a computer readable memory that can instruct the computer or any other programmable data processing device to work in a particular manner, so that the instructions stored in the computer readable memory generate an artifact that includes an instruction apparatus. The instruction apparatus implements a function in one or more processes in the flowcharts and/or in one or more blocks in the block diagrams.

These computer program instructions may be loaded onto a computer or another programmable data processing device, so that a series of operations are performed on the computer or the another programmable device, thereby generating computer-implemented processing. Therefore, the instructions executed on the computer or the another programmable device provide operations for implementing a function in one or more processes in the flowcharts and/or in one or more blocks in the block diagrams.

Although some preferred embodiments of the present application have been described, persons skilled in the art can make changes and modifications to these embodiments once they learn the basic inventive concept. Therefore, the following claims are intended to be construed as to cover the preferred embodiments and all changes and modifications falling within the scope of the present application.

Obviously, persons skilled in the art can make various modifications and variations to the embodiments of the present application without departing from the spirit and scope of the embodiments of the present application. The present application is intended to cover these modifications and variations provided that they fall within the scope of protection defined by the following claims and their equivalent technologies.

What is claimed is:

1. A service data packet encapsulation method, comprising:

obtaining, by a source communications device, a mobility support parameter of a current service, wherein the mobility support parameter is used to indicate whether a corresponding service requires mobility support, and the source communications device comprises at least an identifier (ID) layer and a locator layer;

determining, by the source communications device based on the mobility support parameter of the current service, whether the current service requires mobility support; and obtaining, by the source communications device, a source locator of the source communications device and a destination locator of a destination communications device when determining that the current service does not require mobility support, and performing, by using the source locator and the destination locator, locator layer encapsulation on a data packet that needs to be sent by the current service.

2. The method according to claim 1, wherein the method further comprises:

obtaining, by the source communications device, a source ID and the source locator of the source communications device and a destination ID and the destination locator of the destination communications device when the current service requires mobility support, performing, by using the source ID and the destination ID, ID layer encapsulation on the data packet that needs to be sent by the current service, and performing, by using the source locator and the destination locator, locator layer encapsulation on the data packet that needs to be sent by the current service.

3. The method according to claim 1, wherein the method further comprises:

obtaining, by the source communications device, a destination communications device identifier of the current service; and determining, by the source communications device based on the destination communications device identifier, a communications protocol used by the destination communications device, wherein the communications protocol is a TCP/IP communications protocol in an ID/locator split architecture or a TCP/IP communications protocol in an ID/locator unsplit architecture, a communications device using the TCP/IP communications protocol in the ID/locator split architecture comprises at least an ID layer and a locator layer, and a communications device using the TCP/IP communications protocol in the ID/locator unsplit architecture comprises at least an IP layer.

4. The method according to claim 3, wherein the destination communications device comprises at least an ID layer and a locator layer; and the obtaining, by the source communications device, a source ID and the source locator of the source communications device and a destination ID and the destination locator of the destination communications device when the current service requires mobility support comprises:

selecting, by the source communications device, two IP addresses from a preset address pool as the source ID and the source locator respectively, wherein the address pool is pre-allocated to the source communications device, and the address pool comprises a plurality of IP addresses;

determining, by the source communications device by using a preset mapping relationship between a communications device identifier and an ID, an ID corresponding to the destination communications device identifier, and using the ID as the destination ID; and determining, by the source communications device by using a preset mapping relationship between an ID and a locator, a locator corresponding to the destination ID, and using the locator as the destination locator.

5. The method according to claim 3, wherein the destination communications device comprises at least an IP layer; and the obtaining, by the source communications device, a source ID and the source locator of the source communications device and a destination ID and the destination locator of the destination communications device when the current service requires mobility support comprises:

selecting, by the source communications device, two IP addresses from a preset address pool as the source ID and the source locator respectively, wherein the address pool is pre-allocated to the source communications device, and the address pool comprises a plurality of IP addresses;

obtaining, by the source communications device, a locator of a proxy routing device, and determining, by using a preset mapping relationship between a communications device identifier and an IP address, an IP address corresponding to the destination communications device identifier, wherein the proxy routing device is located between the source communications device and the destination communications device, and supports the TCP/IP communications protocol in the ID/locator split architecture and the TCP/IP communications protocol in the ID/locator unsplit architecture; and using, by the source communications device, the IP address corresponding to the destination communications device identifier as the destination ID, and using the locator of the proxy routing device as the destination locator.

6. The method according to claim 3, wherein the destination communications device comprises at least an ID layer and a locator layer; and the obtaining, by the source communications device, the source locator of the source communications device and the destination locator of the destination communications device when determining that the current service does not require mobility support comprises:

selecting, by the source communications device, one IP address from a preset address pool as the source locator, wherein the address pool is pre-allocated to the source communications device, and the address pool comprises a plurality of IP addresses; and determining, by the source communications device by using a preset mapping relationship between a communications device identifier and an ID and a preset mapping relationship between an ID and a locator, a locator corresponding to the destination communications device identifier, and using the locator as the destination locator.

7. The method according to claim 3, wherein the destination communications device comprises at least an IP layer; and the obtaining, by the source communications device, the source locator of the source communications device and the destination locator of the destination communications device when determining that the current service does not require mobility support comprises:

selecting, by the source communications device, one IP address from a preset address pool as the source locator, wherein the address pool is pre-allocated to the source communications device, and the address pool comprises a plurality of IP addresses;

determining, by the source communications device by using a preset mapping relationship between a communications device identifier and an IP address, an IP address corresponding to the destination communications device identifier; and using, by the source communications device, the IP address corresponding to the destination communications device identifier as the destination locator.

8. A service data packet encapsulation apparatus, comprising a memory and a processor, wherein the memory is configured to store a program and an instruction, the processor is configured to execute the program and the instruction stored in the memory to perform the following operations:

obtaining a mobility support parameter of a current service, wherein the mobility support parameter is used to indicate whether a corresponding service requires mobility support, the current service is run on a source communications device, and the source communications device comprises at least an ID identifier layer and a locator layer;

determining, based on the mobility support parameter of the current service, whether the current service requires mobility support; and obtaining a source locator of the source communications device and a destination locator of a destination communications device when it is determined that the current service does not require mobility support, and perform, by using the source locator and the destination locator, locator layer encapsulation on a data packet that needs to be sent by the current service.

9. The apparatus according to claim 8, wherein the processor is further configured to execute the program and the instruction stored in the memory to perform the following operations:

obtaining a source ID and the source locator of the source communications device and a destination ID and the destination locator of the destination communications device when the current service requires mobility support, perform, by using the source ID and the destination ID, ID layer encapsulation on the data packet that needs to be sent by the current service, and perform, by using the source locator and the destination locator, locator layer encapsulation on the data packet that needs to be sent by the current service.

10. The apparatus according to claim 8, wherein the processor is further configured to execute the program and the instruction stored in the memory to perform the following operations:

obtaining a destination communications device identifier of the current service; and determining, based on the destination communications device identifier, a communications protocol used by the destination communications device, wherein the communications protocol is a TCP/IP communications protocol in an ID/locator split architecture or a TCP/IP communications protocol in an ID/locator unsplit architecture, a communications device using the TCP/IP communications protocol in the ID/locator split architecture comprises at least an ID layer and a locator layer, and a communications device using the TCP/IP communications protocol in the ID/locator unsplit architecture comprises at least an IP layer.

11. The apparatus according to claim 10, wherein the destination communications device comprises at least an ID layer and a locator layer; and the processor is further configured to execute the program and the instruction stored in the memory to perform the following operations:

selecting two IP addresses from a preset address pool as the source ID and the source locator respectively, wherein the address pool is pre-allocated to the source communications device, and the address pool comprises a plurality of IP addresses;

determining, by using a preset mapping relationship between a communications device identifier and an ID, an ID corresponding to the destination communications device identifier, and use the ID as the destination ID; and determining, by using a preset mapping relationship between an ID and a locator, a locator corresponding to the destination ID, and use the locator as the destination locator.

12. The apparatus according to claim 10, wherein the destination communications device comprises at least an IP layer; and the processor is further configured to execute the program and the instruction stored in the memory to perform the following operations:

selecting two IP addresses from a preset address pool as the source ID and the source locator respectively, wherein the address pool is pre-allocated to the source communications device, and the address pool comprises a plurality of IP addresses;

obtaining a locator of a proxy routing device, and determine, by using a preset mapping relationship between a communications device identifier and an IP address, an IP address corresponding to the destination communications device identifier, wherein the proxy routing device is located between the source communications device and the destination communications device, and supports the TCP/IP communications protocol in the ID/locator split architecture and the TCP/IP communications protocol in the ID/locator unsplit architecture; and using the IP address corresponding to the destination communications device identifier as the destination ID, and use the locator of the proxy routing device as the destination locator.

13. The apparatus according to claim 10, wherein the destination communications device comprises at least an ID layer and a locator layer; and the processor is further configured to execute the program and the instruction stored in the memory to perform the following operations:

selecting one IP address from a preset address pool as the source locator, wherein the address pool is pre-allocated to the source communications device, and the address pool comprises a plurality of IP addresses; and determining, by using a preset mapping relationship between a communications device identifier and an ID and a preset mapping relationship between an ID and a locator, a locator corresponding to the destination communications device identifier, and use the locator as the destination locator.

14. The apparatus according to claim 10, wherein the destination communications device comprises at least an IP layer; and the processor is further configured to execute the program and the instruction stored in the memory to perform the following operations:

selecting one IP address from a preset address pool as the source locator, wherein the address pool is pre-allocated to the source communications device, and the address pool comprises a plurality of IP addresses;

determining, by using a preset mapping relationship between a communications device identifier and an IP address, an IP address corresponding to the destination communications device identifier; and using the IP address corresponding to the destination communications device identifier as the destination locator.

\* \* \* \* \*